United States Patent Office 2,961,389
Patented Nov. 22, 1960

2,961,389

PROCESS FOR MODIFYING POLYMERS AND PRODUCTS OBTAINED THEREBY

Roger Arnold Hines and Warren Froemming Busse, Wilmington, Del., assignors to E. I. du Pont de Nemours and Company, Wilmington, Del., a corporation of Delaware No Drawing. Filed Dec. 10, 1957, Ser. No. 701,717

16 Claims. (Cl. 204—154)

This invention relates to a process for modifying polymers to increase their strength, dimensional stability, and resistance to solvents, particularly at temperatures above the crystalline melting points of the polymers and to the improved products obtained thereby. More particularly, this invention relates to an improved process for introducing crosslinks into polymers at an accelerated rate by adding novel crosslinking promoters to the polymers prior to irradiation of the polymers with high-energy particulate radiations whereby products are obtained having improved dimensional stability, appreciable tensile strength, improved resistance to hot solvents, and long-range elasticity at temperatures above the crystalline melting points of the polymers.

It has been well known for a number of years that polymeric substances are modified when subjected to bombardment with high-energy particulate irradiation including accelerated charged particles such as electrons and protons and the particles emitted by nuclear fission. Details of the mechanism of the interaction of these high-energy particles with organic matter, including polymers, are not completely known, but the inititial reaction may be considered to be the absorption of energy by the valence electrons of the irradiated molecules in or near the path of the high-energy radiation. The absorbed energy may be so great that some valence electrons will be shot off fast enough to ionize still other molecules. Some of the displaced electrons will fall back to form neutral molecules, and give up their energy as electromagnetic radiation, which in turn can be absorbed by other molecules and raise them to excited states. Further redistribution of the energy in the molecules can result in the breaking of C—C bonds, or splitting off of H atoms or molecules, producing free radicals or unsaturation, or other reactions.

In the case of high polymers, it is possible to divide them into broad classes, based on the final result obtained by bombardment with high-energy, ionizing, particulate radiation. Some polymers, exemplified by polymethylmethacrylate, polyisobutylene, and polyvinylidine chloride, tend to undergo molecular weight degradation as a major reaction when thus irradiated. Other polymers such as the polymers and copolymers of ethylene, natural rubber, butadiene polymers, polycarbonamides, polyesters, and, in general, polymers of 1 olefins having vinyl end groups which olefins may be represented by the structure $CH_2=CHR$, where R is a radical chosen from alkyl, alkenyl, aryl, and alkaryl radical, undergo molecular combination as a major reaction and eventually become crosslinked. Crosslinking results in increased dimensional stability at high temperatures, the polymers exhibiting significant tensile strength above their normal melting temperature, long-range, rubber-like elasticity, and increased resistance to solvents at elevated temperatures. It is with this second class of polymers, those which become crosslinked on irradiation with high-energy, ionizing, particulate radiation, that this invention is concerned.

It has generally been observed that the efficiency of high-energy particles in crosslinking polymers is quite low. Many chemical reactions have activation energies in the range 20–100 kcal./mole, which corresponds to an energy of about 2–5 electron volts per molecule, and the energy needed to ionize small hydrocarbon molecules such as $C_2H_2$, $C_2H_4$, $C_2H_6$, or $C_6H_6$ is only about 8–12 volts (Handbook of Chem. & Phys. p. 341, 36th ed., Chemical Rubber Publishing Company, 1954–55). Yet polyethylenes of weight average molecular weight of ~150,000 to 600,000 require from about 6 to 1 or 2 megarads of irradiation, respectively, to crosslink them to the gel points where there is one crosslinked monomer unit per weight average molecular weight (Flory, Principles of Polymer Chemistry, chapters 9 and 11). This indicates that it takes over 100 electron volts to produce one crosslink in polyethylene, making the crosslinking mechanism a very inefficient process. Hence relatively heavy irradiation doses, which are expensive to produce and time-consuming to apply, are required to obtain desired levels of crosslinking by methods previously described.

It is one object of this invention to provide a novel process for increasing the efficiency of the aforesaid high-energy particles in producing crosslinks in polymers. It is another object of this invention to produce improved crosslinked polymers in less time with lower energy requirements than have heretofore been required. Other objects and advantages will appear hereinafter.

It has now been discovered, as disclosed herein, that small amounts of solid, polymeric perfluoroolefin resins exemplified, inter alia, by polytetrafluoroethylene, in a finely-divided form dispersed throughout a crosslinkable polymer have the extraordinary property of accelerating the crosslinking reaction when said crosslinkable polymer mixtures are subjected to high-energy, particulate, ionizing radiations.

The polymers which can be treated by the process of this invention are selected from the group consisting of polycarbonamides, polyesters, natural rubber, butadiene polymers, and hydrocarbon polymers obtained by the polymerization of 1-olefins having terminal vinyl groups ($—CH=CH_2$). Examples of such 1-olefins include, inter alia, ethylene, propylene, butene-1, decene-1, and styrene. The hydrocarbon polymer may be a copolymer of two or more of the aforesaid 1-olefins. The polymers in the aforesaid group are characterized by an inherent propensity to undergo crosslinking when subjected to high-energy, ionizing, particulate radiation. The hydrocarbon polymers, such as polyethylene and copolymers of ethylene with other 1-olefins, are particularly desirable and well-suited for use with this invention.

The polymeric perfluoroolefinic resins which may be employed in the process of this invention constitute a class of completely fluorinated polymers which includes, inter alia, polytetrafluoroethylene, polyhexafluoropropene, and copolymers of tetrafluoroethylene and hexafluoropropene. These polymeric perfluoroolefins are most effective when they are polymerized as finely-divided particles, and when they are used before they have ever been heated above their crystalline melting point; this gives particles with a maximum tendency to form extremely thin filaments when milled into another polymer. Under optimum conditions the perfluoroolefins can be so well mixed with the crosslinked polymer that a substantial part of the perfluoroolefin is dispersed into fibers whose diameter is too small to be visible when a thin film of the crosslinkable polymer containing the perfluoroolefin is examined under a microscope at 100×. While any amount between 0.1% and 30% by weight of the solid polymeric perfluoroolefin resin may be employed with the crosslinkable polymer, 0.25–15% by weight is the preferred range.

The radiation which is employed in the practice of this invention comprises high-energy, particulate, ionizing radiation. "High-energy" means that it is of sufficient energy to penetrate an organic substance and produce ionization therein. The particular energy level employed will depend upon such considerations as the most economical source available and the thickness of material which it is desired to treat. "Particulate" refers to the fact that the radiation consists of a beam of high-energy particles such as electrons, protons, neutrons, deuterons, alpha particles, and beta particles. The source of these high-energy particles may be a radioactive element which is undergoing nuclear fission as in an atomic pile. More conveniently it may be a particle accelerator wherein charged particles are accelerated to high energies of the order of 100,000 electron volts and higher, but most suitably between about 500,000 and 4,000,000 electron volts, by means of a suitable voltage gradient such as a resonant cavity accelerator, a Van de Graaff electron generator, a betatron, a synchrotron, a cyclotron and the like. Neutron radiation may be produced by bombardment of selected light metal (e.g. beryllium) targets with high-energy positive particles.

The average penetration of high-energy electrons in matter is roughly proportional to their energy and inversely proportional to the density of the matter, with small correction factors for the atomic number of the absorbing material. A beam of 1 m.e.v. electrons will penetrate to about 0.5 cm. in matter of unit density. If it is desired to treat samples much thicker than the range of penetration of the available ionizing particle radiation, a beam of high energy (short wavelength) electromagnetic radiation which has a relatively high penetrating power, can be used to generate high-energy particle radiation within the sample. It is known that when X-rays or gamma rays of wavelength, $\lambda$, or frequency, $\mu$, (where $\mu = c/\lambda$, $c$ being the velocity of light) are absorbed by matter, the electrons which absorb this radiation may be ejected from matter with a high velocity by photoelectric or by Compton scattering processes. The maximum velocity, $v$, of these electrons from radiation of a frequency $\mu$, is given by the well-known equation $h\mu = \frac{1}{2} mv^2$, where $h = $ Plank's constant and $m$ is the mass of the electron.

The Van de Graaff electron generator provides a particularly convenient source of a beam of accelerated electrons of controllable voltage and current, and has, therefore, been employed in the examples described below to illustrate the subject invention without any purpose to limit the invention either to this type of high-energy particle or to the Van de Graaff generator as the source of electrons.

The expression "standard pass" as employed herein is defined to mean the passing of a sample through a beam of 2 m.e.v. electrons at such a rate as to expose each square centimeter to 12.5 watts of radiation energy. For purposes of illustration, this quantity of energy is provided by a source of 250 microamperes of 2 million electron volt electrons bombarding 51.6 square centimeters of surface area for about one second. A 2 m.e.v. beam of half this current would require an exposure of 2 seconds. In rough approximation, one pass is equal to one megarep. (one million roentgen equivalents physical). One roentgen equivalent physical is the amount of high-energy particle radiation which results in an energy absorption of 83.8 ergs per gram of water or equivalent absorbing material.

The high-energy particles penetrate the crosslinkable polymer to a limited depth which is dependent upon the particular energy level of the electrons employed and upon the density of the irradiated polymer. Generally, if it is desired to assure passage of the electrons all the way through the sample, it is preferable to employ electrons having energies in the range of 500,000 to 4,000,000 electron volts and polymer samples which have a thickness which will give 0.2 to 2.0 grams of material per sq. cm. of surface bombarded by the electrons; thicker samples can be treated by irradiating opposite surfaces in subsequent passes. It is sometimes desirable when using high-energy electron beams to limit the thickness of samples to somewhat lower values, and put a thin metal (e.g. iron or copper) shield (say 2–10 mils thickness with 2 m.e.v. electrons) between the sample and the high-energy source. This slows down some of the electrons and changes the velocity distribution of the beam to give a more uniform radiation dose near the upper surface of the polymer. In some cases, where it is desired to produce an article with an unmodified interior encrusted in a crosslinked shell, there is no need for limiting the thickness of the sample treated to the thickness penetrated by the high-energy particulate radiation employed.

A convenient method for practicing the invention is to conduct the polymer in the form of shaped articles such as film, sheet, fiber, coated wire, hollow tube, or other fabricated articles at a constant rate continuously through a beam of high-energy, particulate radiation as hereinabove described. In most instances the window of the radiation source is maintained at about 8 inches from the specimen undergoing treatment, but this distance is not particularly critical. In the following examples, where a beam of 250 microamps. of 2 m.e.v. electrons covered a cross-section area one inch wide and 8 inches long, at 8 inches from the window, and the sample was placed on a support moving at a rate of about 0.9 inch per second which provided a time of passage for a point through the beam of about 1 second, the resultant exposure was about 12.5 watts per square centimeter per pass. This is defined as a "standard pass."

The temperature during irradiation is conveniently room temperature, but this is not particularly critical. The crosslinking reaction is markedly inhibited at extremely low temperatures such as that of liquid air. On the other hand, the crosslinking reaction proceeds somewhat more rapidly at elevated temperatures, particularly above the melting point where the crosslinkable polymer is more nearly fluid. At such elevated temperatures, however, it is preferable to protect the polymer from oxidation by operation in an inert atmosphere such as nitrogen. Thus any temperature below the decomposition temperature of the polymer may be used.

Several methods are available to determine the amount of crosslinking obtained in a polymer from a given radiation dose. One test, which is particularly applicable to low degrees of crosslinking where there has been only an increase in branching and molecular weight, but no formation of a coherent 3-dimensional network, is to measure the increase in the melt viscosity of the irradiated polymer. This is conveniently determined as a decrease in the melt index of the polymer where melt index is defined as the weight of polymer flowing in ten seconds through a standard orifice having a diameter of 82.5 mils and a length of 315 mils under a constant load of 2160 g. on a 0.373 inch diameter piston above the cylinder containing the molten polymer at a constant temperature of 190° C.

Another test for the degree of crosslinking is based on decreased solubility of crosslinked polymers in solvents at elevated temperatures. It is well known that the degree of swelling of a polymeric gel system caused by contact with a liquid decreases as the number of crosslinks in the gel increases ("Principles of Polymer Chemistry" by P. J. Flory, Cornell U. Press, Ithaca, N.Y., 1953, chapter XIII-3, p. 576). The swollen gel is an elastic solid having considerable dimensional stability, unlike the viscous solutions obtained from non-crosslinked polymers. The test applied to hydrocarbon polymers to determine the relative degree of cross-linking was to immerse about 0.25 g. of a sample, in film or sheet form, in 5 cc. of α-chloronaphthalene containing 1% antioxidant. This mixture was then heated for 4 hours at 150° C. A non-irradiated sample would dissolve completely in a few minutes at this temperature. Slightly crosslinked samples gave a dispersed gel in the solvent. When the sample was crosslinked sufficiently to form a coherent gel, the gel was removed from the hot liquid, quickly wiped off with filter paper, and then placed in a tared dish and weighed.

The degree of swelling was measured as the ratio of the weight of liquid absorbed to the initial dry-weight of polymer. Typical results for the degree of swelling of a commercial branched polyethylene (having a density, annealed, between 0.91 and 0.92 g./cc. at 20° C., and a melt index of 2 and containing no modifiers) after various numbers of standard passes under the electron beam of a Van de Graaff generator are shown in Table A for the purposes of comparison. The first trace of dispersed gel is obtained with this highly-branched, low-density polyethylene at about 2 standard passes; the gel structure formed at less than 4 to 5 standard passes is incomplete so that the swollen gel is unstable and tends to break up on handling. Above about 6 passes, the degree of crosslinking attained is sufficient to provide strong, coherent gels whose degree of swelling is a measure of the degree of crosslinking. It should be understood that if either the solvent or the polymer tested were changed, the degree of swelling might also change since the swelling is a function of the energy of interaction between polymer and solvent as well as of the degree of crosslinking. For a given radiation dose the swelling will change with the initial molecular weight and molecular weight distribution of the polymer.

TABLE A

Radiation dose (high energy electrons)
vs.
Swelling of polyethylene (no modifier)

Number of standard passes: Degree of swelling
    4 ------------------------------------ 19
    6 ------------------------------------ 17.5
    8 ------------------------------------ 14.5
    10 ----------------------------------- 11.3
    12 ----------------------------------- 9.4
    14 ----------------------------------- 8.3
    16 ----------------------------------- 7.6
    20 ----------------------------------- 6.7
    30 ----------------------------------- 5.3

From the foregoing data it is apparent that, without the use of a modifier to promote crosslinking, a large number of standard passes is required to produce a strong coherent gel in a crosslinkable polymer of the class with which this invention is concerned.

In contrast with this, it has now been discovered that when a crosslinkable polymer of the class defined hereinabove is irradiated while containing a small amount of finely-divided, preferably fibrous, solid perfluoroolefin resin dispersed throughout the crosslinkable polymer, the number of standard passes required to produce a given degree of crosslinking is reduced. The increase in degree of crosslinking is shown, for instance, by melt-index decrease or by decrease in the degree of swelling of the polymer when immersed in a hot solvent or by the elongation at higher temperatures. This is illustrated by the following examples:

*Example 1*

For this series of experiments, branched polyethylene resin having a density, annealed, between 0.91 and 0.92 g./cc. at 20° C., a melting point between 110° and 120° C. and a melt index, as hereinabove defined, in the region of 1.8 was employed. One portion was intimately mixed with 0.5% by weight of a finely-divided polytetrafluoroethylene resin; a second portion was mixed with 5.0% by weight of the same polytetrafluoroethylene resin. The mixing was done on a 2" diameter rolls rubber mill at 130° C. for 5 minutes whereby a uniform dispersion of the polytetrafluoroethylene particles throughout the polyethylene resin was achieved. For the purposes of control, a third portion of this polyethylene resin was milled under the same conditions but without adding any powdered polytetrafluoroethylene resin.

The finely-divided polytetrafluoroethylene resin employed was a product prepared by micronizing a dispersion polymer and characterized by a particular size of about $3\mu$ diameter $\times$ $30\mu$ long, having a surface area (by $N_2$ absorption) of 2.5 square meters per gram, and a bulk density of about 200 g./liter.

The milled samples were cut up and compression molded at 150° C. into 35 mil sheets. These sheets then were placed on a fiber-glass mat on a moving table and passed under the high-energy electron beam provided by a Van de Graaff electron generator operating at 2 million electron volts and 250 microamperes current. Various samples were exposed to the electron beam for 4, 6, 8, 10, and 12 standard passes, as defined hereinabove.

After exposure to the high-energy particle radiation, the relative amount of crosslinking obtained in the various samples was measured by determination of the degree of swelling in α-chloronaphthalene by the test described above. The results of these experiments are tabulated in Table I:

TABLE I

| Radiation Dose: Number Standard Passes | Degree of Swelling | | |
|---|---|---|---|
| | Control (No Additive) | Sample Containing 0.5% Polytetrafluoroethylene | Sample Containing 5% Polytetrafluoroethylene |
| 4 | 20.8 | 16.1 | 11.8 |
| 6 | 14.6 | 13.7 | 10.7 |
| 8 | 12.5 | 11.0 | 10.2 |
| 10 | 10.8 | 9.0 | 8.8 |
| 12 | 8.6 | 7.7 | 7.6 |

From the results given in Table I it is apparent that the presence of even 0.5% by weight of the finely-divided polytetrafluoroethylene produced a marked increase in crosslinking at a given radiation dose, as evidenced by decrease in solubility and degree of swelling. The extent of the promotion of crosslinking was greatest for the lower radiation doses.

*Example 2*

For this series of experiments, a branched polyethylene resin having a density, annealed, between 0.92 and 0.93 g./cc. at 20° C., a melting point between 112° and 115° C., and a melt index in the region of 2.0 was employed. Portions of this resin were mixed by milling on a 4" mill at 155° C. for 10 minutes with 0.25%, with 1.0%, and with 5.0%, by weight, respectively, of the extremely fine polytetrafluoroethylene powder as used for Example 1. The milling produced a uniform dispersion of the powdery polytetrafluoroethylene resin in the polyethylene. The milled samples were cut up and compression molded at 160° C. into 30-mil sheets. As in Example 1, a control containing no added polytetrafluoroethylene resin was prepared in the same way.

These sheets were subjected to radiation under the electron beam of a Van de Graaff electron generator operating as described in Example 1.

The relative amount of crosslinking obtained from various radiation doses in the several samples was measured by determination of the melt index, as hereinabove described, of each sample. The results are listed in Table II:

TABLE II

| Radiation Dose: Number of Passes | Melt Index | | | |
|---|---|---|---|---|
| | Control: No Additive | Sample Containing 0.25% Polytetrafluoroethylene | Sample Containing 1% Polytetrafluoroethylene | Sample Containing 5% Polytetrafluoroethylene |
| 0 | 1.99 | 1.70 | 1.01 | 0.24. |
| 0.25 | | 1.36 | 0.87 | 0.20. |
| 1.0 | 1.03 | 0.39 | 0.34 | No flow. |
| 4.0 | 0.07 | No flow | No flow | No flow. |

From the data of Table II it is apparent that the presence in polyethylene of even as little polytetrafluoroethylene resin as 0.25% results in much more crosslinking of the polyethylene, as measured by decrease in melt index, at a given radiation dose than is obtained in the control. It is also evident, particularly in the samples containing 1% and more polytetrafluoroethylene, that a second phenomenon is produced by the addition of finely-divided polytetrafluoroethylene: the melt index of polyethylene is markedly decreased by the addition of polytetrafluoroethylene in the absence of any exposure to radiation. This surprising discovery is further disclosed in a copending application, S.N. 701,703. However, these data show also the promotional effect of the presence of finely-divided polytetrafluoroethylene in polyethylene on the amount of crosslinking of the polyethylene obtained from a given radiation dose.

*Example 3*

For these experiments a linear polyethylene having a density, annealed, between 0.95 and 0.97 g./cc. at 20° C., a melting point above 127° C., and a melt index in the region of 5.0 was employed. The term "linear polyethylene" refers to solid polyethylene in which the chain-structure of the polyethylene molecules is characterized by having branches or side chains at a frequency of less than 1 in 200 carbon atoms of the main chain on the average as disclosed in U.S. Patent 2,816,883, issued December 17, 1957 on an application, filed on August 2, 1951 by A. W. Larchar and D. C. Pease. Such linear polyethylenes melt above 127° C., are exceptionally stiff, and are more crystalline than the flexible, branched polyethylenes characterized by lower densities and melting points which were employed in Examples 1 and 2.

A portion of this linear polyethylene was mixed with 5.0% by weight, of the fibrous polytetrafluoroethylene powder described in Example 2. The mixing was carried out at 160° C. on a 4-inch mill for 10 minutes whereby a uniform dispersion of the powdery polytetrafluoroethylene resin in the linear polyethylene was obtained. The milled samples were cut and molded at 190° C. into 30-mil sheets. These sheets were subjected to electron irradiation as described in Example 2. The relative amounts of crosslinking obtained were measured, as in Example 2, by decrease in melt index. The results of these experiments are listed in Table III.

TABLE III

| Radiation Dose: No. Passes | Melt Index | |
|---|---|---|
| | Control: No Additive | Linear Polyethylene with 5% Polytetrafluoroethylene |
| 0 | 4.87 | 1.27. |
| 0.25 | 3.45 | 0.65. |
| 1.0 | 0.65 | No flow. |
| 4.0 | No flow | No flow. |

From the data of Table III it is apparent that the promotional effect of polytetrafluoroethylene on cross-linking of linear polyethylene is comparable to that obtained with branched, lower melting, lower density polyethylene as described in Example 2.

*Example 4*

In these experiments, a linear polyethylene, as described in Example 3, was used. A portion of this linear polyethylene was mixed on a 4-inch mill at 160° C. with 1% by weight of a fine polytetrafluoroethylene powder prepared in the presence of a dispersing agent; this polytetrafluoroethylene was characterized by a loose agglomerate diameter of about 500 microns, an ultimate particle diameter of about 0.2 microns, and a bulk density of about 500 g./liter. The milled product containing 1% of the fine polytetrafluoroethylene dispersion powder uniformly dispersed throughout was cut up and molded at 180° C. into 30 mil sheets. These sheets were subjected to irradiation with a beam of high energy electrons in a $N_2$ atmosphere, using a beam of only 200 microamps, and shielding the sample with a 0.004 inch thick shield of steel to give a more uniform dosage throughout the thickness of the sample. The relative amount of crosslinking in these more highly-irradiated samples was measured by the degree of swelling in $\alpha$-chloronaphthalene as hereinabove described. The results of these experiments are tabulated in Table IV:

TABLE IV

| Radiation Dose: No. Passes | Degree of Swelling | |
|---|---|---|
| | Control: No Additive | Linear Polyethylene with 1% Polytetrafluoroethylene |
| 8 | 14.7 | 11.3 |
| 16 | 8.1 | 6.9 |
| 32 | 4.1 | 4.4 |

From the data of Table IV it is apparent that the promotional effect of this small amount of added polytetrafluoroethylene in increasing the amount of crosslinking from a given radiation dose is greater at low radiation doses.

*Example 5*

The linear polyethylene described in Example 3 was mixed in various proportions with a finely-divided, solid copolymer of tetrafluoroethylene and hexafluoropropylene by milling for 10 minutes at 160° C. on a 2 inch mill whereby uniform dispersions of 0.2% and 5% by weight of the fluorocarbon polymer in linear polyethylene were obtained. These milled samples were cut up and molded at 180° C. into 30-mil sheets. These sheets were subjected to a radiation dose of 8 passes under the beam of high-energy electrons operating as described in Example 4, using an 8-mil iron shield. The relative amount of crosslinking obtained in each sample was measured by the degree of swelling in $\alpha$-chloronaphthalene as already described hereinabove. Results are listed in Table V:

TABLE V

| Wt. Percent Fluorocarbon Resin Added to Linear Polyethylene | Degree of Swelling after Radiation Dose of 8 Passes |
|---|---|
| 0 | 13.9 |
| 0.2 | 11.4 |
| 1.0 | 12.1 |
| 5.0 | 10.8 |

As in the previous experiments, an increase in the amount of crosslinking of the polyethylene containing perfluorocarbon resin was obtained with a given radiation dose; as little as 0.2% by weight of this copolymer of tetrafluoroethylene and hexafluoropropylene dispersed in linear polyethylene produced a marked decrease in the degree of swelling of the sample in $\alpha$-chloronaphthalene.

*Example 6*

A branched polyethylene of density 0.92 and melt index 0.5 was milled on a 4-inch mill at 160° C. for 10 minutes for the control sample. A second sample was treated in the same way except that 5% of the fine polytetrafluoroethylene (PTFE) of Example 4 was added. A third sample had 5% of another polymer, polymethylmethacrylate (PMMA) added during the milling. A fourth sample had 10% of polymethylmethacrylate added.

All of these samples were then molded to 30 mil sheets at 160° C. They were then placed under an 0.004 inch steel shield and exposed to a beam of 200 microamperes of 2 m.e.v. electrons from a Van de Graaff generator as in Example 4, each sample being given 2, 4, 8, 12, and 16 passes. One pass exposes the sample to 10 watt seconds of radiation.

The swelling of these samples in $\alpha$-chloronaphthalene at 150° C. was then determined as described above. Results are shown in Table VI.

TABLE VI

| Additive | Swelling After Irradiation, Passes | | | | |
|---|---|---|---|---|---|
| | 2 | 4 | 8 | 12 | 16 |
| None | 15.5 | 15.4 | 11.8 | 9.1 | 8.1 |
| 5% PTFE | 7.0 | 7.0 | 5.5 | 4.6 | 4.1 |
| 5% PMMA | 14.5 | 14.8 | 13.1 | 9.1 | 7.9 |
| 10% PMMA | 14.8 | 15.5 | 12.2 | 9.5 | 8.1 |

It is seen from these results that the polymethylmethacrylate does not decrease and may increase the swelling in $\alpha$-chloronaphthalene, so this PMMA does not promote the crosslinking of polyethylene by irradiation.

The sample containing 5% polytetrafluoroethylene, on the other hand, shows a very marked decrease in swelling, indicating a much more tightly crosslinked structure than is obtained by irradiation of the polyethylene alone. A sample containing 5% polytetrafluoroethylene but not given any irradiation disintegrated when put into $\alpha$-chloronaphthalene except for the small residue of the insoluble polytetrafluoroethylene. This shows that the polytetrafluoroethylene alone is not enough to limit the swelling. The polytetrafluoroethylene appears to promote the crosslinking by the irradiation. Extrapolation of the data in Table VI indicates that the swelling of the sample with 5% polytetrafluoroethylene at 4 passes is comparable to the swelling of the control at about 20 passes indicating about a five-fold increase in the efficiency of the crosslinking by the irradiation brought about by the presence of polytetrafluoroethylene.

*Example 7*

Samples of branched polyethylene of density 0.923 and melt index 2.0 were milled under the conditions of Example 6 while adding 0, 5, 10, 15, and 20% of a finely-divided polytetrafluoroethylene. These samples were then pressed into films and irradiated 8 to 16 passes as in Example 6. The effectiveness of crosslinking was then measured by two methods: (1) the swelling in alpha-chloronaphthalene by the method described above, with the results shown in Table VII, and (2) by determining the elongation under small load when heated to temperatures above the crystalline melting point of the polyethylene with the results shown in Table VIII.

TABLE VII

| Percent PTFE Added | Swelling After Irradiation, Passes | | |
|---|---|---|---|
| | 8 | 12 | 16 |
| None | 18.3 | 13.1 | 9.6 |
| 5 | 6.9 | 5.4 | 4.6 |
| 10 | 6.2 | 4.8 | 4.1 |
| 15 | 5.8 | 4.6 | 3.8 |
| 20 | 5.1 | 4.3 | 3.7 |

TABLE VIII

*Tensile behavior of irradiated polytetrafluoroethylene-polyethylene mixtures at temperatures above the melting point*

| Percent PTFE | Irradiation Passes | Max. Temp. Reached ($T_{max}$) | Elongation at $T_{max}$, Percent | Time to Reach $T_{max}$ | Remarks |
|---|---|---|---|---|---|
| 0 | 0 | 125 | >250 | 5 min | No break. |
| | 8 | 125 | >275 | >5 min | Do. |
| | 16 | 165 | >195 | 25 min | Do. |
| 5 | 0 | 125 | >250 | 5 min | Do. |
| | 8 | 140 | 12 | 1 hr | Broke. |
| | 16 | 180 | 6 | 50 min | Do. |
| 10 | 0 | 120 | 175 | 4 min | Do. |
| | 8 | 170 | 19 | 49 min | Do. |
| | 16 | >223 | 6 | >1.7 hr | No break. |
| 15 | 0 | 120 | 275 | 5 min | Break. |
| | 8 | >247 | 6 | >3 hr | No break. |
| | 16 | >248 | <5 | >2.8 hr | Do. |
| 20 | 0 | 140 | 31 | 30 min | Break. |
| | 8 | >240 | 6 | >2.5 hr | No break. |
| | 16 | >230 | <5 | >2.5 hr | Do. |

Table VII shows that the beneficial effects of polytetrafluoroethylene in promoting radiation crosslinking are not limited to quantities of polytetrafluoroethylene of 5% or less but also are found with larger quantities of polytetrafluoroethylene, although the effectiveness per unit weight of polytetrafluoroethylene decreases at the higher concentration. The swelling values in this table are based on the weight of the polyethylene in the original samples. The values would be up to 20% smaller if they had not been corrected for the polytetrafluoroethylene in the original samples. The unirradiated samples dissolved in the $\alpha$-chloronaphthalene, leaving only a residue of the dispersed, insoluble polytetrafluoroethylene.

Table VIII shows that the combination of the higher amounts of PTFE with the irradiation gives mechanical properties at high temperatures which are not obtained with either the polytetrafluoroethylene alone or the radiation alone. The low elongation of the 8 and 16 pass samples containing 5–20% "Teflon" show the presence of a coherent elastic network which is stable up to temperatures of about 140 to 240° C. or higher depending on the amount of polytetrafluoroethylene and the irradiation dose. The very low elongations of the 16 pass samples show the material has a relatively high modulus while in the rubbery state.

These mechanical properties are of particular value in those places where an article may have to support significant loads at temperatures above the melting point of ordinary polyethylene.

The above examples serve as particular illustrations of the subject invention but are not intended as limitations thereof. It should be understood that the subject invention may be practiced with the other crosslinkable polymers of the class disclosed hereinabove. It should be obvious that one skilled in the art of handling and fabricating plastics might make many variations in the methods of preparing mixtures of the polymeric perfluoroolefin resins with the subject crosslinkable polymers. Similarly, various techniques of subjecting these mixtures to irradiation with high-energy, ionizing, particle radiations of the class disclosed herein which are known to those familiar wiht this art, may be employed without departing from the scope of this invention.

The improvements in properties obtained in this invention by adding well dispersed polytetrafluoroethylene to crosslinkable polymers before irradiation, have been explained as being due to an increase in the efficiency of the irradiation in crosslinking the resin. This explanation seems reasonable, since polytetrafluoroethylene resin is known to be readily attacked by high energy radiation and to form free radicals, some of which are quite stable. However, we do not wish to be limited by this explanation and we recognize that other mechanisms might produce the same effects.

It is possible, for example, that the network of extremely fine fibers, formed during the dispersion of the PTFE in the resin, and which appears to cause the increase in melt elasticity described in copending application S.N. 701,703, may interpenetrate and reinforce the network formed by the gel structure of the irradiated crosslinkable resin. In this case the mechanical entanglements of the two different network structures would act effectively as additional crosslinks and produce combinations of effects, such as lower swelling, lower melt index and higher modulus at high temperatures that could not be obtained if the total network were all of the same type. Whatever the cause, one obtains striking and novel effects on dispersing and shearing untreated polytetrafluoroethylene particles in a crosslinkable resin and then irradiating with high energy radiations.

The process of this invention may be applied to the subject crosslinkable polymers which contain other modifiers in addition to perfluoroolefin polymers; such other modifiers may include antioxidants and carbon black added to increase outdoor durability and resistance to high temperature oxidation, and carbon black and other fillers such as silicas, aluminas, glass fibers and the like may be added to increase further the stiffness and dimensional stability of the crosslinkable polymers.

The present invention is particularly useful in increasing the dimensional stability and tensile strength of hydrocarbon polymers at elevated temperatures, thus providing a marked increase in the maximum operating temperature of shaped articles such as fibers, films, sheets, polymer-coated wires and pipe, made from hydrocarbon polymers and then treated by the process of this invention. Particularly useful shaped articles having appreciable dimensional stability and long-range elasticity and tensile strength above the melting point of the hydrocarbon polymer are obtained by the process of this invention when said shaped articles containing 0.25 to 15% by weight of a dispersed perfluoroolefin resin in the hydrocarbon polymer are subjected to a radiation dose of between 25 and 350 watt seconds per square centimeter of surface area, the equivalent of about 2 to 30 standard passes as hereinabove defined. The addition of 2% to 50% by weight of finely-divided carbon black in addition to the fluorocarbon resin prior to irradiation provides an improved method for obtaining particularly useful, tough, flexible, products having properties resembling certain hard rubber products. Other additives in the polymers, such as antioxidants to improve high-temperature aging and outdoor weatherability, may be used in addition to the finely-divided perfluorocarbon resins, in the practice of this invention, without departing from the scope thereof.

We claim:

1. In a process for irradiating a polymer selected from the group consisting of polycarbonamides, polyesters, natural rubber, butadiene polymers, and hydrocarbon polymers obtained by the polymerization of 1-olefins having terminal vinyl groups, with high-energy, ionizing, particulate radiation having an energy of at least about 100 thousand electron volts, the improvement which comprises intimately mixing said polymer with from 0.1% to 30% by weight of a finely-divided polymeric perfluoroolefin resin prior to subjecting the aforesaid polymer to said particulate irradiation whereby the crosslinking of said polymer during irradiation is increased.

2. The process of claim 1 wherein the polymeric perfluoroolefin resin is polytetrafluoroethylene.

3. The process of claim 1 wherein the polymeric perfluoroolefin resin is a copolymer of tetrafluoroethylene and hexafluoropropylene.

4. In a process for irradiating a hydrocarbon polymer obtained by the polymerization of 1-olefins having terminal vinyl groups with accelerated electrons having energies between 100 thousand and 10 million electron volts, the improvement which comprises intimately mixing said hydrocarbon polymer with from 0.1% to 30% by weight of a finely-divided polymeric perfluoroolefin resin prior to subjecting said hydrocarbon polymer to irradiation whereby the crosslinking of said hydrocarbon polymer during irradiation is increased.

5. The process of claim 4 wherein the polymeric perfluoroolefin resin is polytetrafluoroethylene.

6. The process of claim 4 wherein the polymeric perfluoroolefin resin is a copolymer of tetrafluoroethylene and hexafluoropropylene.

7. The process of claim 4 wherein the hydrocarbon polymer is a polyethylene.

8. In a process for irradiating a polyethylene with accelerated electrons having energies between about 500 thousand and 3 million electron volts, the improvement which comprises intimately mixing said polyethylene with from 0.25% to 5% by weight of a finely-divided polytetrafluoroethylene resin prior to subjecting said polyethylene to irradiation whereby the crosslinking of said polyethylene during irradiation is increased.

9. The process of claim 8 wherein the polyethylene is a branched polyethylene having a density, annealed, of from 0.91 to 0.93 g./cc. at 20° C. and a melting point between about 110° and 120° C.

10. The process of claim 8 wherein the polyethylene is a linear polyethylene having a density, annealed, of from 0.95 to 0.97 g./cc. at 20° C. and a melting point above 127° C.

11. A shaped article made from a hydrocarbon polymer obtained by the polymerization of 1-olefins having terminal vinyl groups and containing from 0.1% to 30% by weight of a solid, finely-divided, polymeric perfluoroolefin resin uniformly dispersed therein and irradiated, subsequent to the shaping operation, to the extent of between 25 and 350 watt seconds per square centimeter of surface area with a directed beam of accelerated electrons having energies between 100 thousand and 10 million electron volts, said shaped article exhibiting appreciable dimensional stability and tensile strength and having a long-range, rubber-like elasticity above the melting point of said hydrocarbon polymer and being swollen to form a coherent gel by immersion in α-chloronaphthalene at 150° C.

12. A shaped article made from a polyethylene resin and containing from 0.25% to 15% by weight of solid, finely-divided polytetrafluoroethylene resin uniformly dispersed therein and irradiated, subsequent to the shaping operation to the extent of between 25 and 350 watt seconds per square centimeter of surface area with a directed beam of accelerated electron having energies between 500 thousand and 3 million electron volts, said shaped article exhibiting appreciable dimensional stability and tensile strength and having a long-range, rubber-like elasticity above the melting point of said polyethylene resin and being swollen to form a coherent gel by immersion in α-chloronaphthalene at 150° C.

13. The product of claim 12 wherein the polyethylene resin is a branched polyethylene having a density, annealed, between 0.91 and 0.93 g./cc. at 20° C. and a melting point between 110° C. and about 120° C.

14. The product of claim 12 wherein the polyethylene resin is a linear polyethylene having a density, annealed, between 0.95 and 0.97 g./cc. at 20° C. and a melting point above 127° C.

15. The product of claim 11 where the shaped article is in the form of a film.

16. The product of claim 12 where the shaped article is in the form of a film.

References Cited in the file of this patent

FOREIGN PATENTS 750,923    Great Britain _____ June 20, 1956

OTHER REFERENCES

Brookhaven National Laboratory Report 375, page 26, April 1956.

Jackson et al.: "Rubber Age," vol. 77, pages 865–872, September (1955).

UNITED STATES PATENT OFFICE
Certificate of Correction

Patent No. 2,961,389                                         November 22, 1960

Roger Arnold Hines et al.

It is hereby certified that error appears in the above numbered patent requiring correction and that the said Letters Patent should read as corrected below.

Column 3, line 13, for "crosslinked" read —crosslinkable—; lines 57, 58, 63, and 64, for "$\mu$", each occurrence, read —v—; same column 3, line 62, for "$v$" read —v—; column 10, Table VIII, fifth column thereof, under the heading "Time to Reach $T_{max}$" line 2, for ">5 min" read —<5 min—.

Signed and sealed this 23rd day of May 1961.

[SEAL]

Attest:
ERNEST W. SWIDER,
*Attesting Officer.*

DAVID L. LADD,
*Commissioner of Patents.*